United States Patent [19]

Greacen et al.

[11] 4,239,097
[45] Dec. 16, 1980

[54] MULTIPLE STAGE VIBRATION DAMPER ASSEMBLY

[75] Inventors: John F. Greacen, Ypsilanti; Kerry G. Knight, Washington; Thaddeus Lech, Jr., Roseville, all of Mich.

[73] Assignee: Borg-Warner Corporation, Chicago, Ill.

[21] Appl. No.: 933,391

[22] Filed: Aug. 14, 1978

[51] Int. Cl.³ .................................................. F16D 13/68
[52] U.S. Cl. ..................................................... 192/106.2
[58] Field of Search ........................ 192/106.2, 106.1; 64/27 C

[56] References Cited

U.S. PATENT DOCUMENTS

| | | | |
|---|---|---|---|
| 1,963,187 | 6/1934 | Wood | 192/106.2 |
| 2,276,870 | 3/1942 | Prantl | 64/27 C |
| 2,513,379 | 7/1950 | Thelander | 64/27 C |
| 2,745,268 | 5/1956 | Reed | 192/106.2 X |
| 3,414,101 | 12/1968 | Binder et al. | 192/106.2 |
| 3,534,841 | 10/1970 | Schneider et al. | 192/106.2 |
| 3,556,273 | 1/1971 | Maucher | 192/106.2 |
| 3,800,931 | 4/1974 | Maucher | 192/106.2 |
| 4,024,938 | 5/1977 | Maucher | 192/106.2 |

FOREIGN PATENT DOCUMENTS

| | | | |
|---|---|---|---|
| 2242606 | 3/1975 | France | 192/106.2 |
| 1233273 | 5/1971 | United Kingdom | 192/106.2 |

*Primary Examiner*—George H. Krizmanich
*Attorney, Agent, or Firm*—James A. Geppert

[57] ABSTRACT

A multiple stage damper for the driven member of a vehicle clutch which eliminates objectionable vibration during both engine idle and while the vehicle is in motion. The damper comprises inner and outer hubs with springs therebetween and additional damper springs between the outer hub and the clutch and spring retainer plates to provide two or more damping stages. A two stage damper results when the springs connecting the inner and outer hubs work simultaneously, while a three stage damper results when a first spring or springs are actuated prior to a second spring or springs providing a sequential damping action.

17 Claims, 14 Drawing Figures

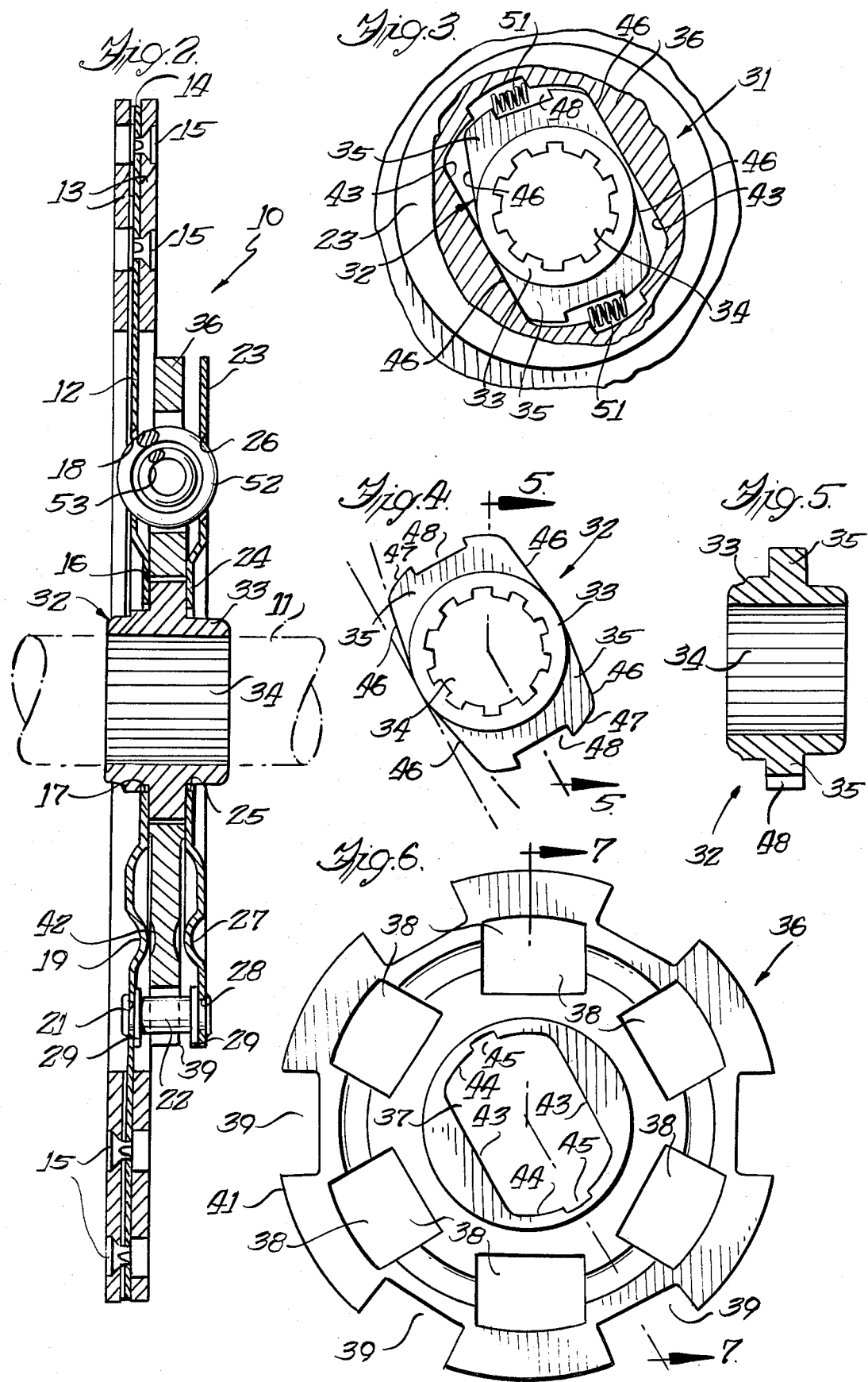

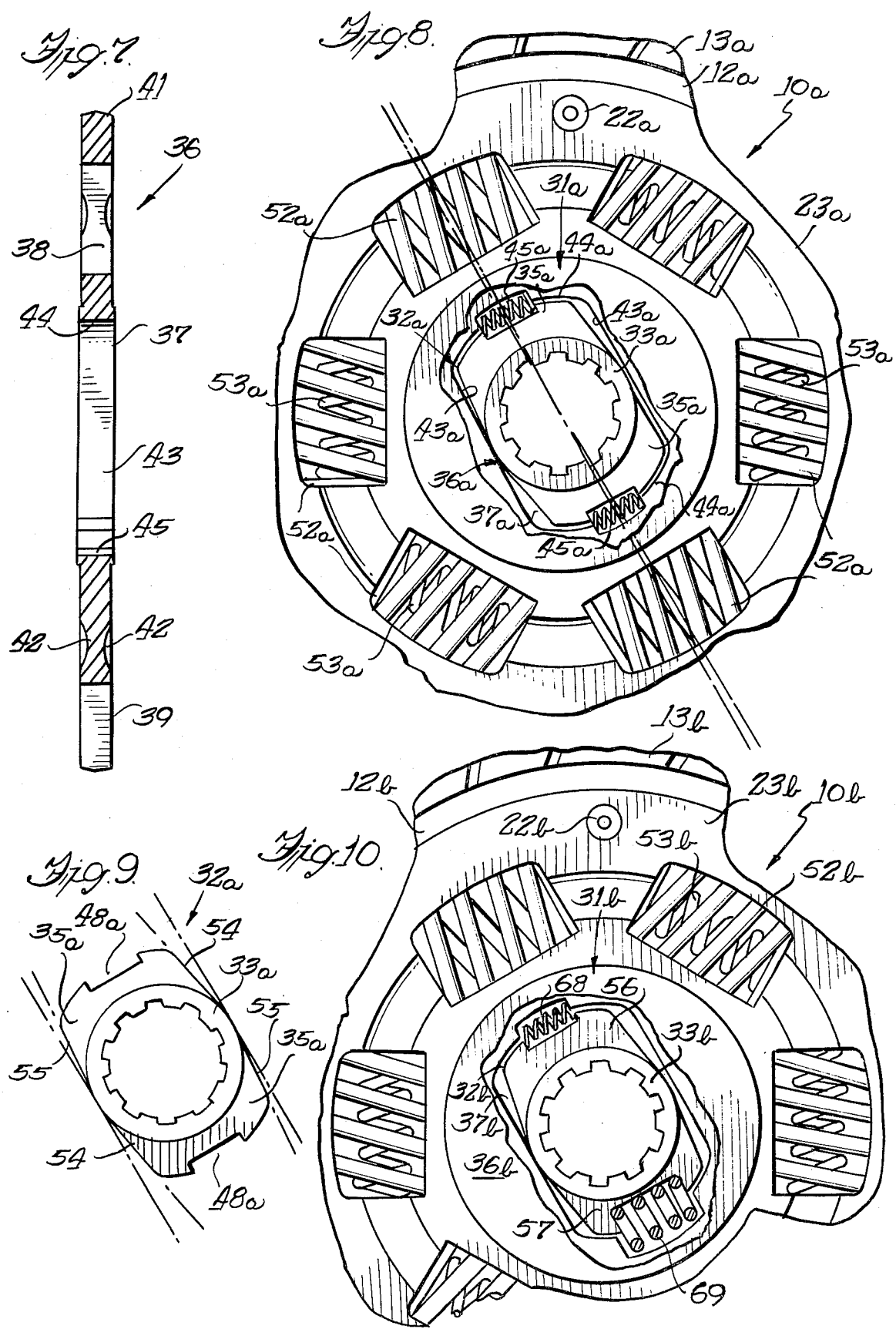

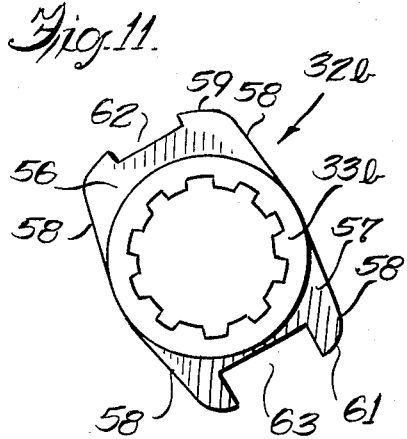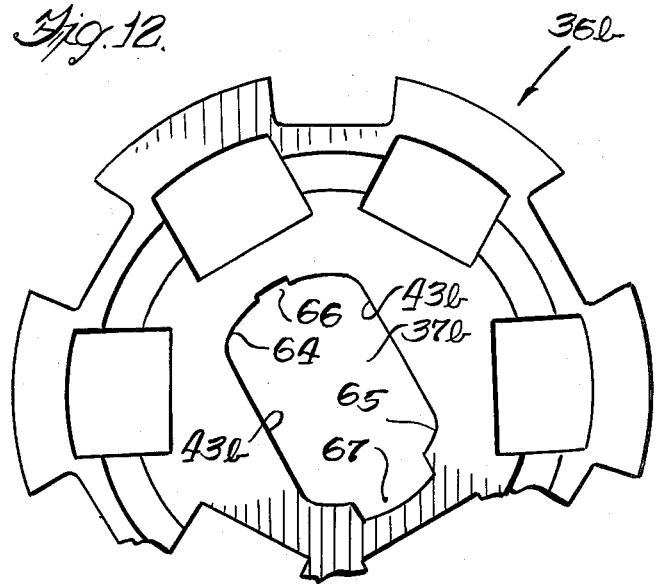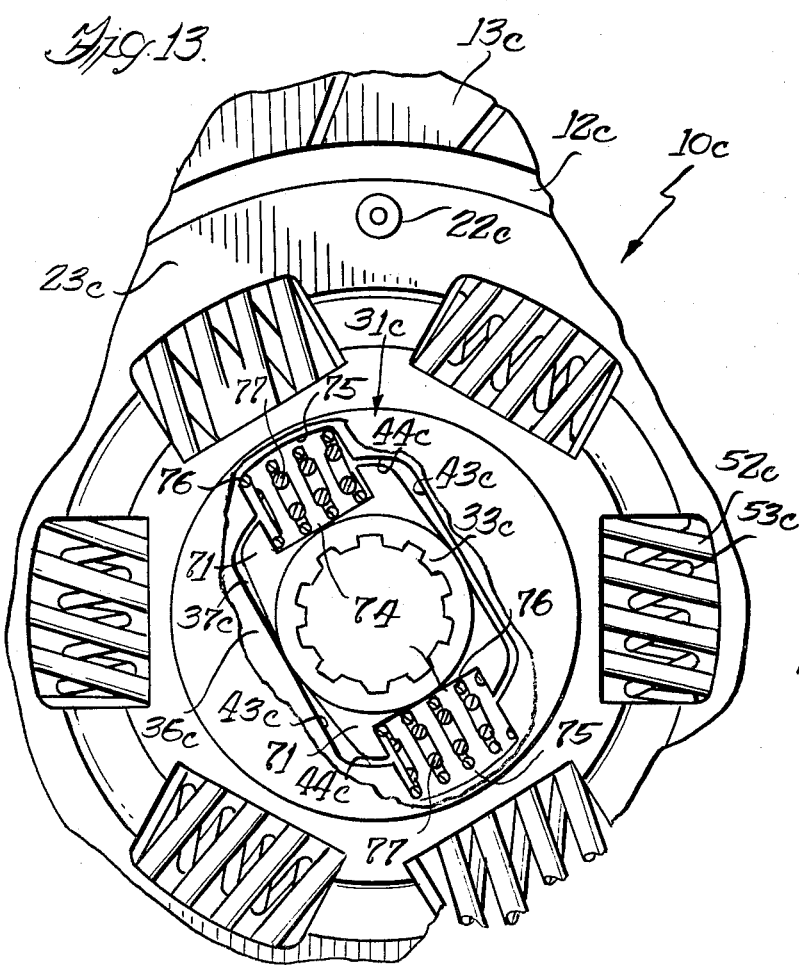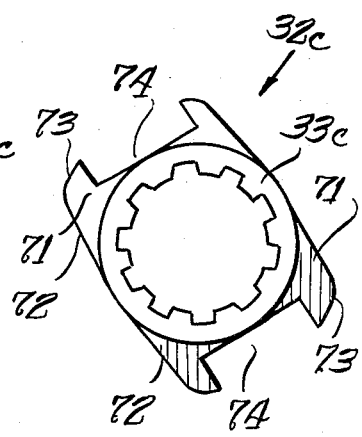

MULTIPLE STAGE VIBRATION DAMPER ASSEMBLY

BACKGROUND OF THE INVENTION

Vibration dampers have been utilized for many years in torsional couplings, such as in the clutch driven member for an automotive vehicle power train to control engine induced torsional vibration in the connected elements of the power train. The vibration damper assembly is interposed in the clutch driven member ahead of a manually operated transmission to neutralize the torsional vibrations emanating from the vehicle engine, which vibrations would otherwise cause disturbing impact loads, pulsations and noises in the transmission and driveline. A vibration damper may also be utilized for a lock-up clutch inserted into a torque converter for an automatic transmission where the vibrations in the direct drive mode as a result of the lock-up between the torque input and the drive shaft would not be hydraulically dampened by the torque converter vibration damping characteristics.

A conventional vibration damper assembly consists of a clutch hub splined to the output shaft leading to the vehicle transmission and having an integral radial flange, a clutch plate and a spring retainer plate sandwiching the hub flange, and a plurality of compression springs received in circumferentially spaced axially aligned sets of openings in the plates and hub flange. The clutch plate and spring retainer plate are rigidly secured together and have limited rotation relative to the hub and flange, and annular friction pads are carried on the opposite surfaces of the clutch plate radially outwardly of the hub flange.

However, special circumstances may occur which will dictate a vibration damper having unusual characteristics so as to control objectionable vibration and/or gear rattle in a transmission which may occur during idling or under full engine load. Obviously, a conventional vibration damper will not be able to handle such special circumstances, but the present invention has such capabilities to overcome these problems.

SUMMARY OF THE INVENTION

The present invention comprehends the provision of a novel vibration damper assembly for use in a torsional coupling or automotive vehicle clutch which provides a multi-stage damping operation. The lowest spring rate stage acts to dampen gear rattle in the transmission at idle when the clutch is engaged and the transmission is in neutral. This rattle is caused by unevenness in the power supplied by the engine at low rpms. The higher stage or stages in the damper acts to cushion vibrations at higher engine speeds or loads.

The present invention also comprehends the provision of a novel multi-stage vibration damper assembly utilizing a two-part hub assembly having an inner hub and an outer hub yieldably connected by low rate compression springs. To provide a two-stage damper, the springs connecting the inner and outer hubs work simultaneously, while to produce a three-stage damper, one spring or spring set connecting the hubs provides a reaction force as soon as the hubs rotate in relation to each other and, after several degrees of rotation, a second spring or spring set contact both the hubs to supply an additional reaction force at a higher rate than the first stage. In all instances, the springs connecting the outer hub with the clutch plates provide the final damping stage.

The present invention further comprehends a novel multi-stage vibration damper assembly wherein the inner hub has an outer contour that is symmetrical about its centerline but consists of slightly converging edges beyond the hub barrel joined at each end by an arcuate segment. The opening in the outer hub is slightly larger than the inner hub contour with its contour consisting of parallel walls or edges joined by arcuate segments at the ends. The arcuate segments on the outer contour of the inner hub and the inner periphery of the outer hub are provided with complementary spring pockets to receive the lower rate compression springs utilized for the first stage or stages of damping action.

Another object of the present invention is the provision of a novel multi-stage vibration damper assembly having inner and outer hubs wherein the inner hub pilots in the outer hub along the major and minor diameters of the cam shape of the inner hub, and piloting is no longer done between the hub and the driving plate. Therefore, the clearance between the two hubs can be increased or decreased allowing the driving member to compensate for out of squareness between the flywheel and the transmission input shaft. The outer hub is piloted in the driving member by the springs of the final stage inserted in the aligned windows formed in the clutch plate, spring retainer plate and the outer hub.

A further object of the present invention is the provision of a novel multi-stage vibration damper assembly having inner and outer hubs wherein the area of contact between the hubs is larger than that for a splined connection and therefore the compressive stresses are reduced. Also, the tolerance requirements to achieve uniform contact of the mating surfaces between the hubs during engagement are not as stringent as with mating splines. Further, the spring pockets between the hubs allow for fewer springs than designs requiring separate springs for the coast and drive directions.

Further objects are to provide a construction of maximum simplicity, efficiency, economy and ease of assembly and operation, and such further objects, advantages and capabilities as will later more fully appear and are inherently possessed thereby.

DESCRIPTION OF THE DRAWINGS

FIG. 2 is a cross sectional view taken on the irregular line 2—2 of FIG. 1.

FIG. 3 is a partial rear elevational view showing the hubs in their engaged drive position.

FIG. 4 is a rear elevational view of the inner hub.

FIG. 5 is a cross sectional view through the inner hub taken on the irregular line 5—5 of FIG. 4.

FIG. 6 is a rear elevational view of the outer hub.

FIG. 7 is a cross sectional view taken on the irregular line 7—7 of FIG. 6.

FIG. 8 is a partial rear elevational view of a second embodiment of vibration damper having a hub providing different travel in the drive and coast directions.

FIG. 9 is a rear elevational view of the inner hub of FIG. 8.

FIG. 10 is a partial rear elevational view of a third embodiment of vibration damper providing a three-stage operation.

FIG. 11 is a rear elevational view of the inner hub of FIG. 10.

FIG. 12 is a partial rear elevational view of the outer hub of FIG. 10.

FIG. 13 is a partial rear elevational view of a fourth embodiment of vibration damper providing a three-stage operation.

FIG. 14 is a rear elevational view of the inner hub of FIG. 13.

DESCRIPTION OF THE PREFERRED EMBODIMENTS

Figure 1:
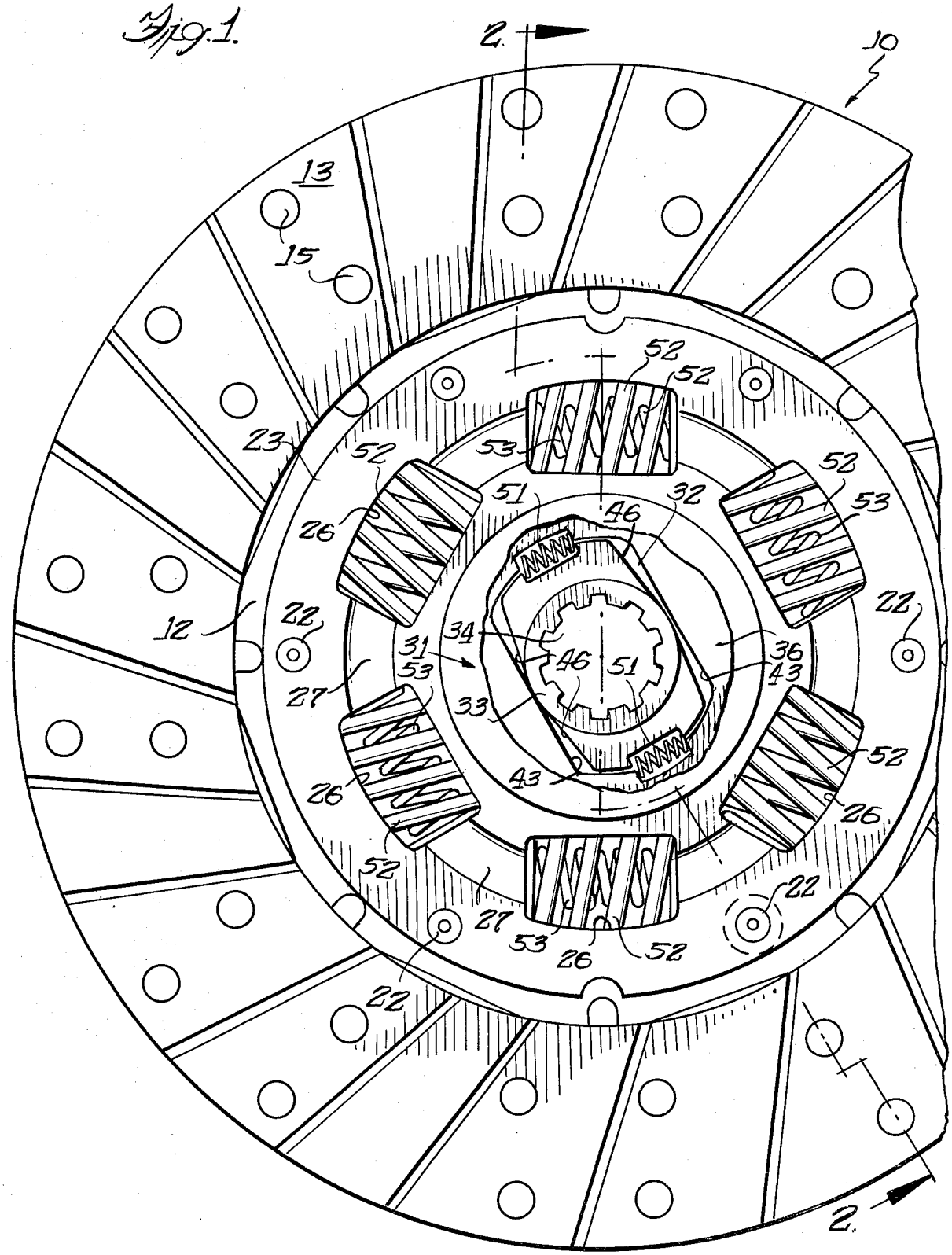
FIG. 1 is a partial rear elevational view of one embodiment of vibration damper providing a two-stage operation.

Referring more particularly to the disclosure in the drawings wherein are shown illustrative embodiments of the present invention, FIGS. 1 and 2 disclose a clutch plate assembly embodying one form of vibration damper 10 where the clutch plate assembly is adapted to be mounted on a driven shaft 11 and positioned between a flywheel and a pressure plate of a vehicle clutch (not shown). The clutch plate assembly incorporating the vibration damper 10 includes a clutch or driving plate 12 having annular friction facings 13, 13 secured to the opposite surfaces of the plate adjacent the outer periphery 14 thereof by suitable securing means, such as rivets 15. The plate 12 has a laterally offset inner periphery 16 defining a central opening 17 to be journalled on a hub barrel 33. A plurality of circumferentially spaced spring windows 18 are formed in the plate and connected by arcuate concave portions 19, and a plurality of openings 21 receive the reduced ends of shoulder rivets 22 to connect this plate with a spring retainer plate 23.

The spring retainer plate 23 also has a laterally offset inner periphery 24 defining a central opening 25; the offset peripheries 16 and 24 extending inward towards each other. This plate has spring windows 26 connected by arcuate concave portions 27 and openings 28 to receive the opposite ends of the rivets 22. The rivets 22 may have washers 29 at the opposite ends to support and space the plates 12 and 23 in the assembly.

A hub assembly 31 for the vibration damper 10 comprises an inner hub 32 having a hub barrel 33 with an internally splined opening 34 receiving the driven shaft 11 therein and a generally rectangular flange formed of opposed portions 35, 35; and an outer hub 36 having a slightly larger generally rectangular central opening 37 to operatively receive the flange portions 35, 35, a plurality of circumferentially spaced spring windows 38 adapted to be axially aligned with the windows 18 and 26 in the plates 12 and 23, respectively, and a plurality of elongated notches 39 formed in the outer periphery 41 of the outer hub and adapted to receive the rivets 22. Slightly concave arcuate grooves 42 form a circle on each side of the flange joining the spring windows 38.

The central opening 37 is formed with a pair of parallel elongated sides 43, 43 and a pair of slightly curved edges 44, 44, each end edge having a centrally located notch 45 formed therein. The distance between the sides 43, 43 of opening 37 is slightly greater than the diameter of the hub barrel 33. With respect to the flange on the hub barrel 33, the flange portions 35 extend from diametrically opposite sides of the barrel, with each portion having slightly converging edges 46, 46 tangentially intersecting the barrel 33 and terminating in a slightly curved end edge 47 complementary to the end 44 of the opening 37. Each end edge 47 is formed with a notch 48 substantially identical to and normally opposite the notch 45 in the end edge 44. Each edge 46 is located at an angle of approximately 9° with respect to the longitudinal center line through the inner hub 32.

FIGS. 1 and 2 show the damper assembly 10 with a pair of small compression springs 51 in the spring pockets formed by the aligned pairs of notches 45, 48, and a spring 52 or concentric springs 52, 53 are provided for each axially aligned set of spring windows 18, 38, 26. The hub barrel 33 and flange portions 35, 35 are piloted in the outer hub 36 along the major diameter defined as the distance between the arcs of end edges 44, 44 and the minor diameter defined as the distance between the parallel sides 43, 43. The outer hub 36 is piloted in the driving member assembly by the springs 52, 53 positioned in the windows of the clutch plate 12, spring retainer plate 23 and outer hub 36. Thus, there is no piloting between the inner hub 32 and the clutch plate 12, and the clearance between the inner hub 32 and the outer hub 36 can be increased or decreased allowing the driven member to compensate for any out-of-squareness between the flywheel and the transmission input shaft 11.

As seen in FIGS. 1 and 3, the clutch plate 12 and spring retainer plate 23 and the outer hub 36 can rotate relative to the inner hub 32 as limited by the angle between the edges 46, 46 and the parallel sides 43, 43; relative movement being yieldably opposed by the compression springs 51. Thus, there is travel of approximately 8° in either the drive or coast directions before the inner and outer hubs engage. Once this degree of travel has been achieved (see FIG. 3) any additional torque is damped by the springs 52, 53 in the spring windows.

The lowest rate stage governed by the springs 51 dampens gear rattle in the transmission at idle when the clutch is engaged and the transmission is in neutral. This rattle is caused by unevenness in the power supplied by the engine at low rpm's. As an example, engaging an air conditioning unit will decrease the engine rpm and increase the resulting rattle.

Although this embodiment of damper provides approximately 8° of arcuate movement between the inner and outer hubs, the amount of arcuate movement can be decreased to 6° or 4° as desired. Also, the degree of movement in the coast direction can be less than the degree of movement in the drive direction. Considering the embodiment shown in FIGS. 8 and 9, like parts will have the same reference numeral with the addition of a script a. This damper assembly 10a includes a clutch plate 12a with friction facings 13a, a spring retainer plate 23a secured to the plate 12a by shoulder rivets 22a, aligned spring windows to receive concentric springs 52a, 53a, and a hub assembly 31a comprising an inner hub 32a with a barrel 33a and opposed flange portions 35a, 35a and an outer hub 36a having a central opening 37a.

The opening 37a is identical to the opening 37 in the embodiment of FIGS. 1 through 7 with parallel sides 43a and curved end edges 44a having notches 45a, 45a, except that the notches 45a, 45a are slightly offset from a longitudinal centerline through the opening. As seen in FIG. 9, the inner hub 32a has flange portions 35a with one side edge 54 at an approximately 6° angle and the opposite edge 55 at an approximately 2° angle from the longitudinal centerline of the inner hub. The edges 54, 54 of the flange portions are positioned on diagonally opposite sides of the inner hub as are the edges 55, 55. Thus, this embodiment will provide a 6° movement in the drive direction and a 2° movement in the coast direction. Also, the notches 48a, 48a are slightly offset from the longitudinal centerline of the inner hub; the notches being offset in opposite directions. The operation of this embodiment is substantially identical to that of the embodiment of FIGS. 1–7 except for the difference of angular motion between the inner and outer hubs for the drive and coast directions.

FIGS. 10 through 12 disclose a third embodiment of vibration damper assembly 10b wherein like parts will have the same reference numeral with the addition of a script b. This embodiment of damper provides for a three-stage version of the damper having a low rate intermediate stage, and includes a clutch plate 12b and spring retainer plate 23b secured together by shoulder rivets 22b, friction facings 13b mounted on the plate 12b, aligned spring windows in the plates for concentric springs 52b, 53b and a hub assembly 31b. The hub assembly includes an inner hub 32b having a barrel 33b and oppositely disposed flange portions 56 and 57, and an outer hub 36b having a central opening 37b. Each flange portion 56 or 57 has slightly converging edges 58 joined by a curved end 59 or 61, respectively; the curved end 59 having a central notch 62 while the curved end 61 has an enlarged central notch 63.

The central opening 37b of the outer hub 36b is defined by a pair of parallel sides 43b, 43b and a pair of curved ends 64, 65. The end 64 has a central notch 66 opposite to the notch 62 to form a spring pocket for a small compression spring 68, and the end 65 has an enlarged central notch 67 opposite to the notch 63 to form an enlarged spring pocket for a larger compression spring 69. As seen in FIG. 10, the notch 67 is greater in length than the notch 63.

This assembly provides a three-stage damping action with the initial and intermediate stages occurring between the inner and outer hubs; the intermediate stage reducing the velocity of the inner hub relative to the outer hub prior to metal-to-metal contact between the edges 58 and the sides 43b. In operation, when engagement of the clutch plate 12b is initiated, the lowest rate spring 68 begins to supply a reaction force as soon as the hubs start to rotate in relation to each other. After several degrees of rotation wherein the longer notch 67 provides a limited lost motion with respect to the intermediate rate spring 69, the spring 69 contacts both the inner and outer hubs and supplies an additional reaction force at a higher rate than the first stage. The intermediate stage spring 69 is intended to eliminate the "klunk" sound resulting from the engagement of the inner and outer hubs as the edges 58 contact the sides 43b.

Depending on the rate of the intermediate stage spring 69, the final stage may or may not begin to compress its springs 52b, 53b before the inner hub 32b contacts the outer hub 36b. Once the inner and outer hubs are in metal-to-metal contact, then the third stage springs 52b, 53b become the sole damping force.

FIGS. 13 and 14 disclose a fourth embodiment of vibration damper having a high rate intermediate stage wherein like parts have the same reference numerals with a script c. The damper assembly 10c includes a clutch plate 12c and a spring retainer plate 23c joined by shoulder rivets 22c, friction facings 13c secured to the outer periphery of the plate 12c, aligned spring windows in the plates to receive concentric springs 52c, 53c, and a hub assembly 31c. The hub assembly includes an inner hub 32c having a barrel 33c and oppositely disposed flange portions 71, 71, and an outer hub 36c having a central opening 37c to receive the inner hub.

Each flange portion 71 has slightly converging edges 72 tangentially intersecting the barrel 33c and joined by curved ends 73; each end having an enlarged central notch 74 formed therein.

The central opening 37c of the outer hub 36c has a pair of parallel sides 43c, 43c joined by a pair of curved ends 44c, 44c; each end being formed with an enlarged notch 75 cooperating with a facing notch 74 in portion 71 to form a spring pocket. Each of the oppositely positioned spring pockets houses an outer low rate compression spring 76 and a higher rate concentric inner compression spring 77. As seen in FIG. 13, the outer spring 76 is of a length to be conformably received in the facing notches 74, 75 while the inner spring 77 has an expanded length that is shorter than the length of the notches 74, 75.

This damper assembly 10c provides for a three-stage damping function having a high rate intermediate stage. In operation, as engagement of the clutch plate 12c is initiated, rotation of the plates 12c and 23c and the outer hub 36c, connected by the concentric spring sets 52c, 53c, relative to the inner hub 32c acts to first compress the outer springs 76 to provide the initial reaction force. As the length of each spring 77 is less than the length of the associated notch, compression of springs 76 does not act to compress springs 77 until several degrees of relative rotation occur between the inner and outer hubs. After the several degrees of rotation, the edges of the notches 74, 75, engage the inner springs 77 to provide an intermediate stage of damping at a relatively high spring rate. This intermediate stage slows the contact of and will eliminate any "klunk" sound as the edges 72 and 43c of the inner and outer hubs, respectively, engage. Once the inner and outer hubs engage to act as a unit, the springs 52c, 53c in the aligned openings in the plates and the outer hub provide the third stage of damper action.

In each of the above embodiments, the areas of contact between the hubs is larger than in a splined engagement, and therefore compressive stresses are reduced. The configuration of the hubs has no sharp corners or stress risers, the parts are simpler to manufacture and the tolerance requirements to achieve uniform contact of the mating surfaces during engagement are not as stringent as with mating splines. The inner hub has a much greater shear strength and, in the event of a failure in the inner hub, the resulting broken pieces will not be able to turn freely inside the outer hub as would be the case if the teeth were broken off a splined design. Also, the spring pockets allow for the use of fewer springs than designs which require separate springs for the coast and drive directions.

We claim:

1. A vibration damper assembly for use in a torsional coupling comprising a hub assembly operatively connected to a driven shaft, a driving plate rotatably mounted on said hub assembly, a spring retainer plate rotatably mounted on said hub assembly and secured to said driving plate for rotation therewith, said hub assembly including an inner hub and an outer hub, said inner hub having a barrel and oppositely extending flange portions having slightly converging edges tangentially intersecting said barrel and joined at the outer ends by curved edges having outwardly opening notches therein, said outer hub being sandwiched between said driving and spring retainer plates and having a central opening receiving said inner hub for limited rotation therein, said opening having a pair of parallel walls joined by a pair of curved edges complementary to the curved edges on the inner hub, each curved edge having an inwardly opening notch facing a notch in the flange portion of the inner hub, resilient means received in a pair of facing notches between said inner and outer hubs yieldably resisting relative rotation therebetween, a plurality of circumferentially spaced aligned windows in said plates and outer hub, and at least one compression spring received within each set of windows, said relative rotation between said inner and outer hubs providing a first stage of angular displacement and said compression springs providing a second stage of angular displacement.

2. A vibration damper assembly as set forth in claim 1, in which said converging edges are oriented at equal angles relative to the longitudinal centerline through the inner hub.

3. A vibration damper assembly as set forth in claim 1, in which the converging edges of the opposed flange portions are oriented at different angles relative to the longitudinal centerline through the inner hub.

4. A vibration damper assembly as set forth in claim 1, in which said resilient means comprises a relatively small compression spring received in each facing pair of notches.

5. A vibration damper assembly as set forth in claim 1, in which said resilient means comprises a pair of concentric compression springs in each facing pair of notches, the outer spring being of a length conforming to the length of the notches and the inner spring being of a length shorter than the length of the notches.

6. A vibration damper assembly as set forth in claim 5, in which said inner springs provide for limited lost motion between said inner and outer hubs before engagement thereof to provide a three-stage damping function.

7. A vibration damper assembly as set forth in claim 6, in which said inner springs have a higher compression rate than said outer springs.

8. A vibration damper assembly as set forth in claim 1, in which the facing notches at one end of said inner hub are larger than the oppositely disposed facing notches, and a higher rate spring is received in said enlarged notches.

9. A vibration damper assembly as set forth in claim 8, in which the enlarged notch in the curved end of the outer hub is longer than the enlarged notch in the curved end of the inner hub to provide for lost motion between the higher rate spring and the outer hub.

10. A vibration damper assembly as set forth in claim 9, in which the higher rate spring provides an intermediate damping stage prior to contact between the inner and outer hubs.

11. A vibration damper assembly as set forth in claim 1, in which said notches in the inner hub are centrally positioned on said curved ends to provide a symmetrical design.

12. A vibration damper assembly as set forth in claim 3, in which said notches in the inner and outer hubs are slightly offset from the centerline through the inner hub.

13. A vibration damper assembly for a vehicle friction clutch comprising a hub assembly operatively connected to a driven shaft and including an inner hub and an outer hub, a clutch plate journalled on said inner hub and terminating at its outer periphery in oppositely disposed friction facings secured thereto, a spring retainer plate secured to said clutch plate for rotation therewith, said clutch plate and spring retainer plate sandwiching the outer hub therebetween, a plurality of circumferentially spaced axially aligned windows in said plates and outer hub, at least one compression spring received in each set of windows, and means limiting relative rotation between said plates and outer hub, said outer hub having a central opening receiving said inner hub for limited rotation therein and defined by a pair of parallel walls joined by a pair of curved ends, an inwardly opening elongated notch formed in each curved end, said inner hub including a barrel and a pair of oppositely extending flange portions, each flange portion being defined by a pair of outwardly converging edges tangentially intersecting said barrel and joined by a curved end, a outwardly opening notch formed in each curved end and facing the correspondingly aligned notch in the outer hub, at least one relatively small compression spring received in each pair of facing notches to yieldably resist relative rotation between said inner and outer hubs, said relative rotation allowed between said inner and outer hubs providing a first stage of angular displacement and said compression springs in the spring windows providing a second stage of angular displacement between said hubs and said plates.

14. A vibration damper assembly as set forth in claim 13, in which said converging edges of each flange portion are located at equal angles to the longitudinal centerline through the inner hub to provide equal relative rotation in both drive and coast directions of said clutch.

15. A vibration damper assembly as set forth in claim 14, in which said converging edges of each flange portion are located at different angles to the longitudinal centerline of the inner hub to provide greater relative rotation in the drive direction compared to the coast direction of the clutch.

16. A vibration damper assembly as set forth in claim 13, in which each pair of facing notches house an outer lower rate compression spring and an inner concentric higher rate compression spring, the outer spring being of a length generally conforming to the length of the notches and the inner spring being of a length shorter than the notches, said inner and outer springs in each pair of notches providing for an initial stage and an intermediate stage of damping between said inner and outer hubs.

17. A vibration damper assembly as set forth in claim 13, in which the pair of facing notches at one end of said inner hub are larger than the oppositely disposed pair of notches, the length of the larger notch in the outer hub being greater than the length of the larger notch in the inner hub, and a higher rate compression spring received in said larger notches to provide an intermediate stage of damping action between said inner and outer hubs.

* * * * *